May 6, 1958 A. E. REINERT Re. 24,469
CONCENTRATION OF CHEMICAL LIQUORS
Original Filed Jan. 9, 1952
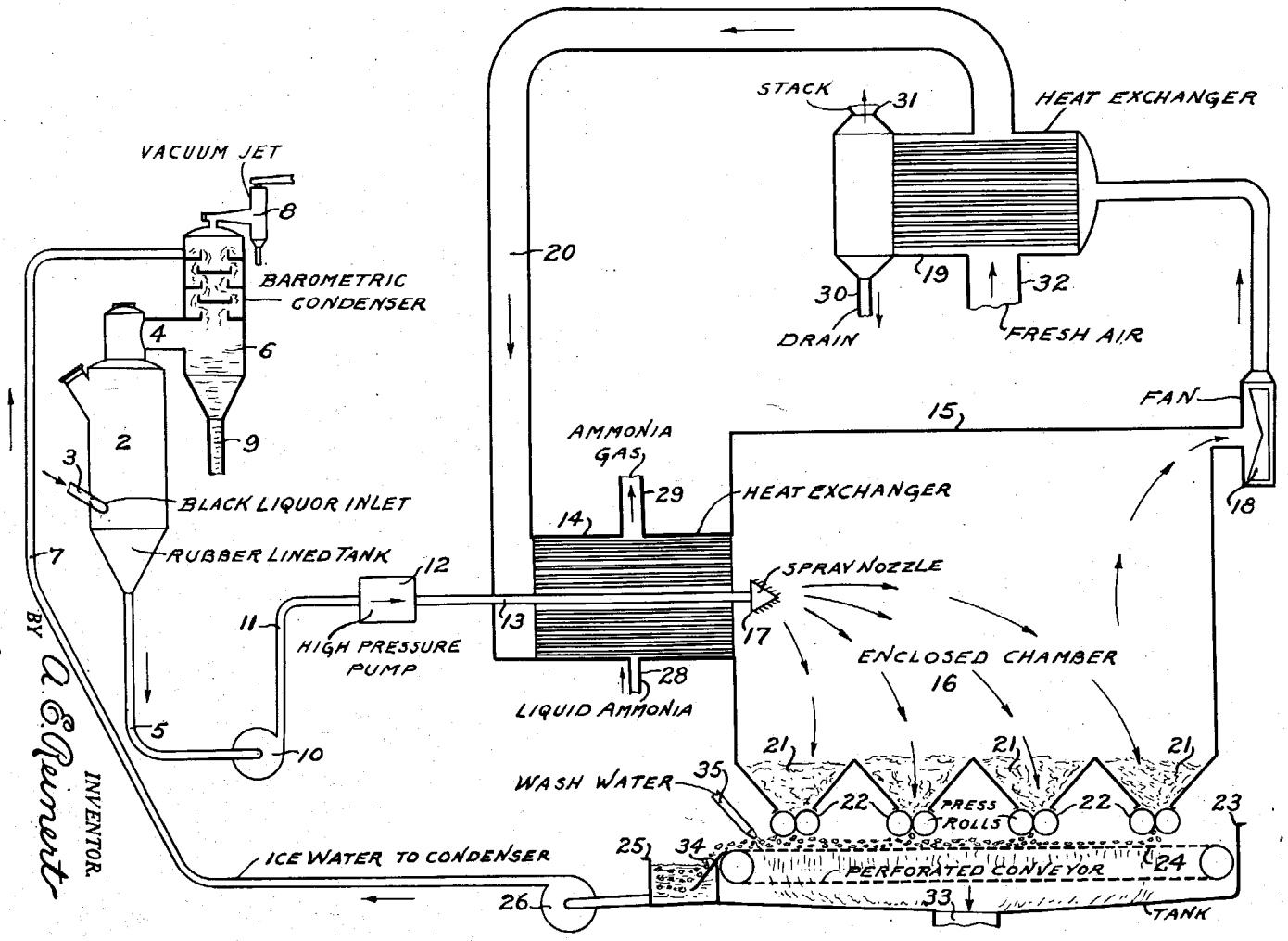
INVENTOR.
BY A. E. Reinert
Lieber & Lieber
ATTORNEYS.

United States Patent Office

Re. 24,469
Reissued May 6, 1958

24,469

CONCENTRATION OF CHEMICAL LIQUORS

Armin E. Reinert, Shawano, Wis., assignor to Herbert H. Clark, Oshkosh, Wis.

Original No. 2,780,281, dated February 5, 1957, Serial No. 265,700, January 9, 1952. Application for reissue November 12, 1957, Serial No. 696,895

2 Claims. (Cl. 159—48)

Matter enclosed in heavy brackets [ ] appears in the original patent but forms no part of this reissue specification; matter printed in italics indicates the additions made by reissue.

The present invention relates generally to improvements in the art of treating solid bearing liquids in order to remove excess liquid from the solutions, and relates more specifically to an improved method and/or system for concentrating sulphite liquor produced by the sulphite process in paper pulp mills.

The primary object of my invention is to provide an economical and efficient method of concentrating sulphite liquor with the aid of an automatically functioning system composed of simple apparatus.

The concentration and disposal of spent sulphite liquor from paper pulp mills utilizing the sulphite process of manufacturing paper has heretofore been a major problem, and while many different methods and types of evaporators and concentrators have heretofore been proposed and tried experimentally and to some extent commercially, none of these have proven entirely satisfactory. These waste sulphite liquors are discharged from the pulp mills in large quantities and at high temperature approximating the boiling point of water, and contain from ten to fifteen percent of solids in suspension, thus causing very objectionable contamination of rivers and streams if the fresh liquor is deposited directly therein. While it is not essential that the concentration be continued until all of the liquid has been removed and dry solids result, it is desirable to remove the greater proportion of the liquid ingredients of the sulphite liquor and to discharge the concentrated residue or solid ingredients at vastly reduced temperature preparatory to final disposal thereof.

It is therefore an important object of the present invention to provide an improved process of effectively removing excess liquid from spent sulphite liquor, and for delivering the concentrated solid constituents in readily disposable condition.

Another important object of the invention is to provide a method of commercially concentrating sulphite liquor by refrigeration, sublimation, and pressure application in a continuous and effective manner.

A further important object of my invention is to provide an improved spent paper mill liquor concentrating system utilizing relatively standard equipment assembled so as to constantly treat large volumes of the liquid in an economical and effective manner.

Still another important object of this invention is to provide a closed circuit system for removing excess liquid from sulphite liquor from paper pulp mills, and wherein the excess liquid in cool condition is utilized to initially reduce the temperature of the fresh liquor.

An additional object of the invention is to provide a simple and relatively inexpensive system for effecting concentration of sulphite liquor to any desired degree regardless of fluctuations in the supply and variations in the proportions of the ingredients.

These and other objects and advantages of my invention will be apparent from the following detailed description.

A clearer conception of the several steps involved in the improved method, and of the construction and functioning of a commercial system involving this method, may be had by referring to the drawing accompanying and forming a part of this specification wherein the various parts are identified both by name and by suitable reference characters.

The single figure of the drawing is a diagram depicting a typical commercial embodiment of a system for continuously exploiting the improved method of concentrating sulphite liquor delivered thereto in heated condition from the paper or pulp mill.

While only one typical assemblage of apparatus adapted to deliver the final product in liquid but highly concentrated condition, has been shown and described by way of illustration, it is not the intention to unnecessarily restrict the use of the particular apparatus illustrated by virtue of this limited showing; and it is also contemplated that specific descriptive terms employed herein be given the broadest possible interpretation consistent with the disclosure.

Referring to the drawing, the typical system diagram illustrated, comprises in general, a rubber lined tank 2 having a fresh and hot sulphite liquor inlet 3 near its medial portion and being provided at its upper end with a vapor outlet 4 and its lower end with an initially cooled liquor discharge conduit 5; a barometric or similar condenser 6 communicating with the supply tank outlet 4 and having a cooling water inlet pipe 7 and a vacuum producer 8 associated with its upper end while its lower portion is provided with the usual tail pipe 9; a centrifugal pump 10 for receiving liquid from the tank discharge conduit 5 and for delivering this initially cooled liquid through another conduit 11 into a high pressure hydraulic pump 12 having a discharge line 13; a heat exchanger or refrigerator 14 cooperating with the high pressure line 13 to materially reduce the temperature of the liquid flowing therethrough; a housing 15 forming an enlarged closed chamber 16, and a spray nozzle 17 at the delivery end of the high pressure line 13 within the chamber 16 adjacent to one end wall of the housing 15; an induced draft fan 18 adjacent to the opposite end wall of the housing 15 for removing vapors separated by sublimation within warmer portions of the chamber 16 and for urging these vapors through a second heat exchanger 19 adapted to admit cool fresh air to the chamber 16 through an air duct 20 and the refrigerator 14; a series of hoppers 21 at the bottom of the chamber 16 each having a pair of cooperating press rolls 22 therebelow; a concentrated liquor receiving tank 23 located below the press rolls 22 and having therein an endless perforated conveyor 24 for separating the solid ice delivered by the rolls from the treated liquor; a trough 25 at the delivery end of the conveyor 24 having suitable controls for liquid delivered therefrom; and a centrifugal pump 26 for withdrawing ice cold water from the trough 25 and for transporting this liquid through the pipe 7.

The rubber lined tank 2 is preferably formed of steel or other suitable metal, and the condenser 6 may be of the barometric or any other suitable type adapted to create a high degree of vacuum within the tank 2 and to condense and constantly remove the vapors rising from the hot sulphite liquor admitted through the inlet 3. By virtue of the fact that the condenser 6 is operable by ice cold water controllably admitted from the trough 25 by the pump 26 through the supply pipe 7, and that the vapors are rapidly removed from the tank 2 without applying heat and thereby eliminating scaling, the temperature of the fresh liquor admitted at the inlet 3 is promptly reduced from approximately 220° F. to somewhat below atmospheric temperature.

The centrifugal pump 10 is operable to constantly transfer the initially cooled sulphite liquor from the conduit 5 through the conduit 11 into the high pressure hydraulic pump 12 which should preferably be or a type adapted to deliver the liquor at a pressure in excess of two thousand pounds per square inch to the refrigerator 14 through the spray pipe 13. The refrigerator may be operated by ammonia or any other type of refrigerant admitted in liquid form through a lower inlet 28 and discharged in gaseous condition through an upper outlet 27, and this refrigerator 14 should be adapted to somewhat lower the temperature of the liquid flowing through the line 13 to the spray nozzle 17, and to also lower the temperature of the fresh pre-cooled air admitted through the duct 20 considerably below water freezing temperature and preferably to about 20° F.

The refrigerated fresh air is delivered from the heat exchanger 14 into the chamber 16 around the spray nozzle 17 and the housing 15 should preferably be formed of wood or other relatively good insulation so as to prevent excessive heating of the upper portion of the chamber 16 wherein the nozzle 17 converts the sulphite liquor into snow. The hoppers 21 at the bottom of the housing 15 need not be so well insulated so that somewhat warmer temperatures will exist therein and will remove considerable moisture from the snow by sublimation. This moisture is withdrawn from the chamber 16 by the exhaust fan 18 and is condensed in the heat exchanger 19 from which the liquid of condensation is discharged through a drain 30 while the gases escape through a stack 31. Fresh cool air may be admitted to the heat exchanger 19 through an inlet 32 and is delivered thereby through the duct 20 to the refrigerator 14.

The hoppers 21 are adapted to receive the snow delivered from the nozzle 17 and by the cold air from the refrigerator 14 as shown, and the press rolls 22 should be constantly operated to simultaneously compress the snow flakes into solid ice particles and to express the residual sulphite liquor from the ice. The perforated endless conveyor 24 should be located within the sulphite liquor collecting tank 23 with the upper conveyor run directly beneath the press rolls 22 and constantly advancing toward the trough 25, so that the concentrated sulphite liquor will drop into the tank 23 and may be withdrawn through the lower tank outlet 33 while the solid ice particles will be discharged over a chute 34 into the trough 25. The ice particles will contain only pure water but may have some solid ingredients of the sulphite liquor adhering to the surface thereof, and these may be washed off into the tank 23 by fresh water delivered through a nozzle 35 before they reach the chute 34.

The trough 25 should be kept supplied with an abundance of water the temperature of which will be constantly reduced to approximately 32° F. by the ice cubes or particles delivered thereto by the conveyor 24, and the centrifugal pump 26 should be continuously operated and controllably fed from the trough 25 so as to deliver an abundant supply of ice cold water through the pipe 7 to the barometric condenser 6. The refrigerator 14 and the several pumps thus function to keep the condenser 6 operating at maximum efficiency and to reduce the degree of refrigeration required to a minimum, by maintaining a constant circulation of cold liquid through the initial elements of the system.

The automatic functioning of the entire system in order to effect continuous exploitation of the improved method of concentrating the sulphite liquor, should be clearly apparent from the foregoing description of the construction and operation of the apparatus; and while the various pumps, heat exchangers and other elements are standard and readily available equipment they must necessarily cooperate in a particular manner in order to obtain the desired results. While the concentrated liquor is still in liquid form with its percentage of solid constituents considerably increased upon a single pass through the system, the liquid content may be substantially eliminated by subjecting the product of the first concentration to further treatment in one or more successive similar systems or special evaporators.

From the foregoing detailed description it will be obvious that my improved method is not only highly efficient and adapted for commercial use in large or small paper and pulp installations, but it may also be exploited with relatively standard and inexpensive equipment properly assembled and operated. The concentration of the sulphite liquor is accomplished in successive stages not only by refrigeration and vacuum, but by sublimation in the chamber 16 and final compression between the press rolls 22; and by utilizing the solid ice separated by these rolls to cool the liquid which operates the condenser 6, maximum economy of operation results.

It should be understood that it is not desired to limit this invention to the exact steps of the method or to the precise apparatus for exploiting the method herein specifically described and shown, for various modifications within the scope of the appended claims may occur to persons skilled in the art.

I claim:

*1.* The method of continuously concentrating spent hot sulphite liquor delivered from paper mill digesters and which contains excess water, which method comprises, initially subjecting the hot liquor to a partial vacuum to remove some of the excess water in the form of vapor, thereafter subjecting the partially dehydrated liquor to high pressure and to low temperature and spraying the same through a restricted orifice into a confined space to convert the liquor into snow containing congealed water and concentrated sulphite liquid, mechanically separating the congealed water from the concentrated sulphite liquid, heat treating the congealed water to convert it into cold liquid water, and condensing the vapor initially removed from the hot liquor by subjecting said vapor in heat exchange relationship to cold liquid water obtained from said congealed water separated from the snow.

*2. The method of concentrating chemical liquor containing water and which is derived from paper mill digesters or the like, which method comprises, initially subjecting the liquor to vacuum to remove some of the water in the form of vapor, thereafter subjecting the partially dehydrated liquor to pressure and to temperature below 32° F. and injecting the same through a restricted orifice into a confined space to convert the liquor into snow containing congealed water and concentrated chemical liquid, separating the congealed water from the concentrated chemical liquid, converting the separated congealed water into cold liquid water, and condensing the vapor initially removed from the chemical liquor by subjecting it to heat exchange relationship with cold liquid water derived from said congealed water.*

References Cited in the file of this patent or the original patent

UNITED STATES PATENTS

| | | |
|---|---|---|
| 981,860 | Jackson | Jan. 17, 1911 |
| 1,273,208 | Weil | July 23, 1918 |
| 1,976,204 | Voorhees | Oct. 9, 1934 |
| 2,009,283 | Warner | July 23, 1935 |
| 2,312,474 | Peebles | Mar. 2, 1943 |
| 2,411,152 | Folsom | Nov. 19, 1946 |
| 2,471,035 | Hurd | May 24, 1949 |
| 2,533,125 | Levinson et al. | Dec. 5, 1950 |
| 2,542,041 | Mason et al. | Feb. 20, 1951 |
| 2,556,250 | Bauman | June 12, 1951 |
| 2,595,852 | Hopper | May 6, 1952 |

FOREIGN PATENTS

| | | |
|---|---|---|
| 243,982 | Great Britain | Dec. 10, 1925 |